Jan. 27, 1953  E. R. PRICE  2,626,690
TRANSMISSION OPERATING MECHANISM
Filed Jan. 19, 1946  5 Sheets-Sheet 3

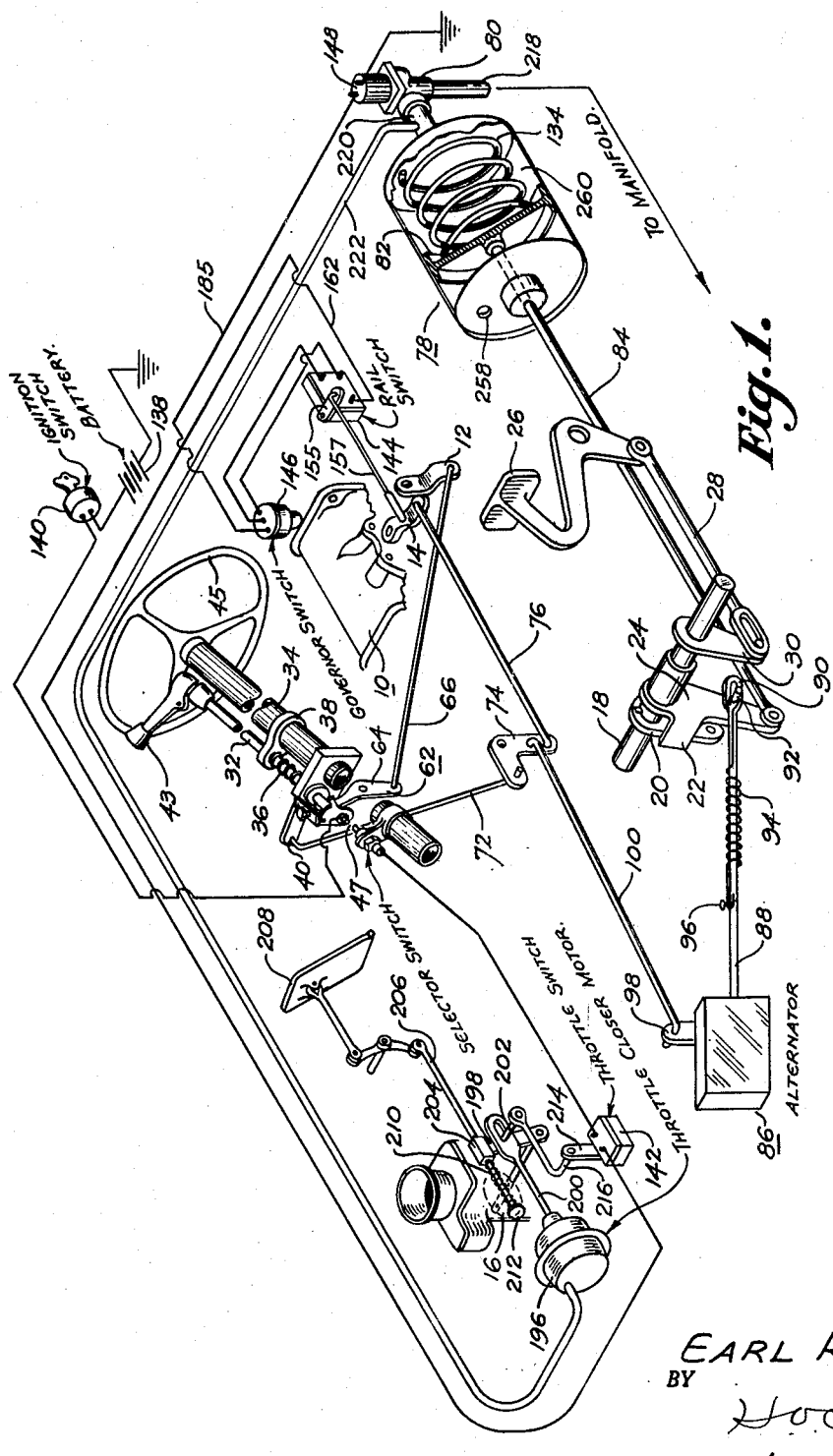

INVENTOR.
EARL R. PRICE.
BY
H. V. Clayton
ATTORNEY.

Jan. 27, 1953 E. R. PRICE 2,626,690
TRANSMISSION OPERATING MECHANISM
Filed Jan. 19, 1946 5 Sheets-Sheet 4

INVENTOR.
EARL R. PRICE.
BY
H.O.Clayton
ATTORNEY.

Patented Jan. 27, 1953

2,626,690

UNITED STATES PATENT OFFICE 2,626,690

TRANSMISSION OPERATING MECHANISM

Earl R. Price, South Bend, Ind., assignor to Bendix Aviation Corporation, South Bend, Ind., a corporation of Delaware Application January 19, 1946, Serial No. 642,240

15 Claims. (Cl. 192—.073)

This invention relates in general to the power transmission mechanism of an automotive vehicle and in particular to means for operating the change-speed transmission of said mechanism.

One of the principal objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission, and the operation of the friction clutch to facilitate said settings, being effected by power means if the driver elects this operation of the mechanism.

Yet another object of my invention is to supplement the above described power means with an engine throttle controlling mechanism whereby said throttle is closed by said power means during the operation of the transmission and clutch.

A further object of my invention is to provide, in an automotive vehicle including a fluid coupling, a friction clutch and a three speeds forward and reverse transmission, means for operating and for facilitating the operation of said transmission including power means, comprising a single acting motor, which is automatically operable, after the accelerator is released, to establish the transmission either in its second gear setting or its high gear setting, depending upon the speed of the vehicle, the friction clutch being operated by said motor to facilitate this operation of the transmission, said first-mentioned means further including manually operated means for effecting any one of the gear settings of the transmission.

Yet another object of my invention is to provide means for operating the friction clutch and the three speeds forward and reverse transmission of an automotive vehicle, said means including a single acting motor, the power element of which is operably connected to both the clutch and to means for effecting the second and high gear operations of the transmission, and further including manually operated means for effecting the low and reverse gear settings of the transmission.

An important object of my invention is to provide a power plant for an automotive vehicle, the control of which requires but a minimum of physical and mental effort on the part of the driver; and to this end it is an object of my invention to provide, in a power plant including a friction clutch of standard design, a fluid coupling of standard design, a change gear transmission and an internal combustion engine having a throttle valve, manually and power operated mechanism for operating the throttle valve, clutch and the transmission, the controls for said mechanism being limited to the accelerator, a vehicle speed responsive governor, the clutch pedal, and the shift lever, the accelerator of said four controls receiving the greater use.

A further object of my invention is to provide a simple mechanism for operating the friction clutch and three-speeds forward and reverse transmission of an automotive vehicle, the operation of said mechanism being controlled by a shift lever preferably positioned beneath the steering wheel of the vehicle, a vehicle speed responsive governor, the accelerator of the vehicle and the manually operated clutch pedal of the vehicle, the parts of said mechanism being so constructed and arranged that the transmission is manually operated to establish the mechanism in any one of its settings and furthermore so constructed and arranged that the transmission may be operated by power means to establish the same in either its second gear setting or its high gear setting, the latter operations being facilitated by a power operation of the friction clutch.

Yet another and important object of my invention is to provide power and manually operated mechanism for operating a three-speeds forward and reverse transmission, the power means of said mechanism being operative to alternately effect the second and high gear settings of the transmission and the manually operated means of said mechanism being selectively operative to establish the transmission in any one of its four settings.

A further object of my invention is to provide manually and power operated mechanism for operating a friction clutch and a three-speeds forward and reverse transmission, said mechanism being in part controlled by a shift lever selectively movable to any one of seven positions in the control of the mechanism, one of said positions making possible the power operation of the mechanism.

Yet another object of my invention is to include, in a power and manually operated mechanism for operating a three-speeds forward and reverse transmission, an alternator, that is, a mechanism operative to successively move an operating rod of the mechanism in two different directions whereby there is provided means, which may be operated by a single acting pressure differential operated motor, for successively establishing the transmission in two of its four gear settings.

A further object of my invention is to provide manually and power operated mechanism for operating a three-speeds forward and reverse transmission and a friction clutch, said mechanism being capable of effecting a manual operation of the transmission and also capable, after a selector lever of the mechanism is first operated to establish the transmission in its second gear setting and then positioned in a certain automatic setting, of effecting a power operation of the transmission to alternately effect the second and third forward speed settings thereof, the friction clutch being disengaged to facilitate each of said operations and reengaged after each operation is completed.

Yet another object of my invention is to provide, in the power plant of an automotive vehicle, a power and manually operated friction clutch and three-speeds forward and reverse transmission operating mechanism, said mechanism being controlled by a vehicle speed responsive governor, a shift lever, the accelerator of the vehicle and the clutch pedal, said mechanism being manually operated, by an operation of the shift lever and clutch pedal, to selectively effect any one of the aforementioned four settings of the transmission or its neutral setting and said mechanism being power operated, by an operation of the governor, the accelerator and the shift lever, to alternately establish the transmission in its second and third gear settings, the clutch being operated to facilitate said operations.

Other objects of the invention will appear more fully hereinafter from the following detailed description when taken in connection with the accompanying drawings wherein a single embodiment of the invention is illustrated.

Figure 1 is a diagrammatic view of my invention disclosing the principal features thereof;

Figure 2 is a wiring diagram of the electrical mechanism disclosed in Figure 1;

Figure 9:
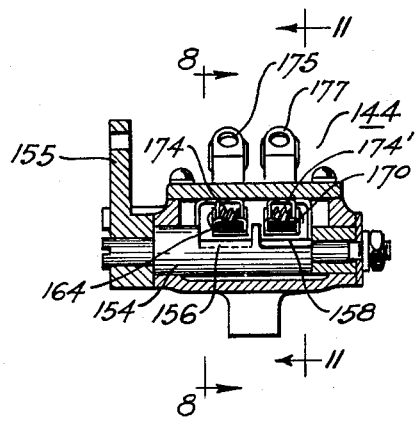
Figure 9 is a sectional view of the transmission operated cut out switch of my invention.
Figure 11:
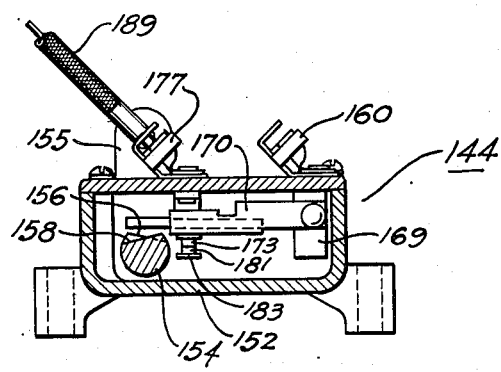
Figure 12:
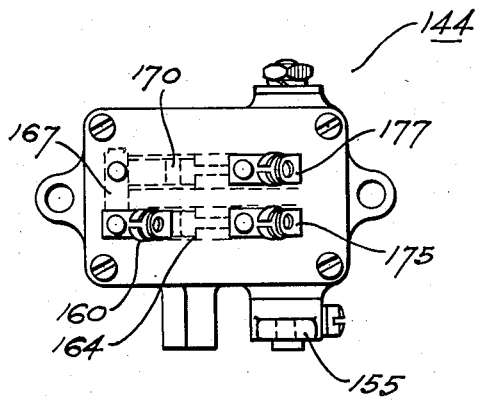

Figure 11 is another sectional view of the switch mechanism 144 said view being taken on the line 11—11 of Figure 9; and Figure 12 is a plan view disclosing details of the switch mechanism 144.

Referring now to Figure 1 disclosing a preferred embodiment of my invention, a three-speeds forward and reverse transmission 10 of well-known design, is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14; for operating the engine throttle 16, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings.

A feature of my invention lies in the combination of a fluid coupling, such e. g. as that which was incorporated in several 1941 and 1942 passenger vehicles, with the aforementioned mechanism which operates the aforementioned transmission, throttle and friction clutch; and said coupling, which is preferably incorporated in the power plant between the engine and the friction clutch, includes, of course, an impeller and a vaned rotor, the latter serving to drive the aforementioned driving plate of the clutch.

The friction clutch is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is operably connected, by a link 28, to a crank 30 which is drivably connected to the shaft 18. As is disclosed in Figure 1 the connection between the crank 30 and link 28 is of the lost motion type to obviate a movement of the clutch pedal when the clutch is power operated by the mechanism described hereinafter.

Describing now the essence of my invention, the same lies in the manually and power operated mechanism for operating the clutch operating shaft 18, the transmission operating cranks 12 and 14 and the throttle operating mechanism, all of said mechanism being disclosed in Figure 1. The shift rail operating cranks 12 and 14 are actuated by force transmitting means including a rotatable and bodily movable shaft 32 extending alongside the steering column 34 of the vehicle. As is disclosed in Figures 1, 5 and 6, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32, which incidentally was used on a 1942 car, is also such that the cross-shift movement of the shift lever, that is, the movement in a plane perpendicular to the plane of the steering column, results in a movement of the shaft 32 to either effect a shift rail selecting operation of the crank 12 or effect a declutching operation of the clutch 42 and a closing of a selector switch 47 to prepare the mechanism for its power operation.

Describing the aforementioned clutch mechanism 42, the said mechanism includes a member 44 sleeved over the lower end of the shaft 32, said member being permanently secured as by brazing to the crank 40. The lower end portion of the member 44 is provided with a flange 46 which is recessed at 48, Figure 5, to provide a keyway for a key portion 50 of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell-crank lever 62 fits within the spool shaped portion of the clutch member 52 and the lower arm 64 of said lever is pivotally connected, by a link 66, to the shift rail selecting crank 12. As is disclosed in Figure 6, the spring 36 serves to bias the clutch 42 and shaft 32 as a unit downwardly, the movement being limited by a stop 68, Figure 6, constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 43 upwardly in a plane perpendicular to the plane of the steering wheel; and this operation serves to rotate the bell crank lever 62 in a counter-clockwise direction, Figure 5, the spring 36 being compressed and the flange 46, Figure 6, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movement of the crank 40 which is preferably connected to the crank 14 by force transmitting means including link 72, a bell crank lever 74 and a link 76.

There is thus provided, by the above described mechanism, means for manually operating a three-speeds forward and reverse transmission; and in this manual operation of the transmission the shift lever 43 is movable to six different positions, said selective movement outlining the letter H.

An important feature of my invention lies in the power means for operating the transmission and clutch and said means is diagrammatically disclosed in Figure 1. The principal element of this power means consists of a single-acting fluid pressure motor 78 operably connected to the clutch throwout shaft 18 and to the shift rail operating crank 14; and said motor is controlled by a standard type of solenoid operated three way valve 80, no claim to which is made.

Describing now the details of the aforementioned power means, the power element 82 of the motor 78 is connected to the crank 24 by a link 84; said crank is yieldingly connected to an alternator 86 by means, preferably including a pin 92 extending from the crank. One end of a spring 94, preferably coiled around the link 88, is connected to a pin 96 secured to said link; and the other end of said spring is fastened to the pin 92. A crank 98 of the alternator mechanism 86 is pivotally connected to the bell crank lever 74 by a link 100.

Figure 4:
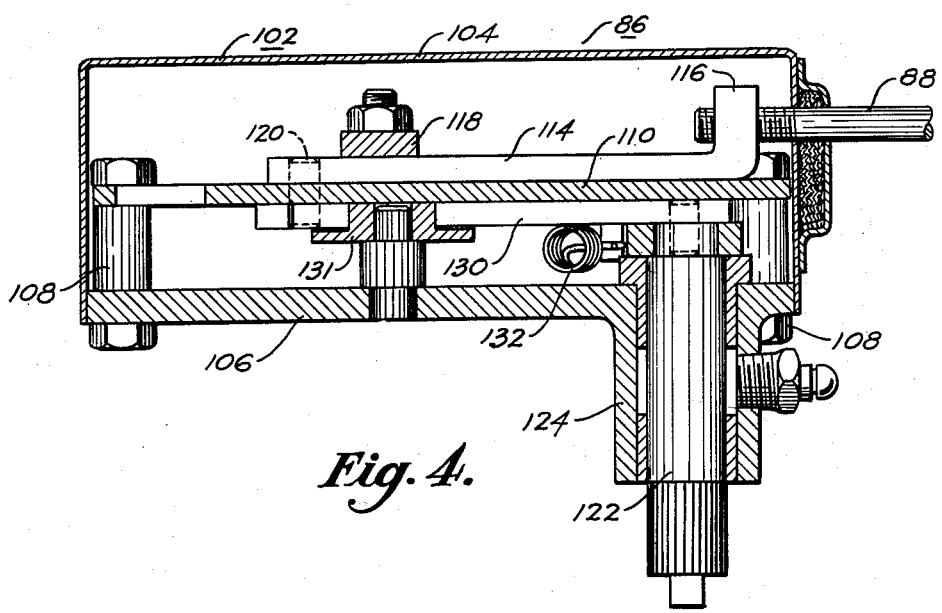
Figure 4 is a sectional view of the alternator unit said view being taken on the line 4—4 of Figure 3.

Describing now the details of the alternator 86, that is the direction changing mechanism of my invention, the same includes a casing 102, Figure 4, of two parts 104 and 106. To the casing part 106 there is detachably secured by bolts 108 a plate 110 having a V-shaped guide slot 112 therein, and a thrust member 114 adjustably secured at 116 to the link 88 and positioned between a strap 118 and the outer face of the plate 110 is provided with a laterally extending pin 120 which extends through the aforementioned V-shaped slot. To the outer end of a rotatable shaft 122 journalled in a boss 124 extending from the casing part 106 there is drivably connected the aforementioned crank 98, Figure 1; and to the inner end of the shaft 122 there is drivably connected a bell crank lever 126. To one end of the latter lever there is pivotally connected a thrust link 128 which is recessed at its outer end to receive the pin 120; and to the other end of the lever 126 there is pivotally connected another thrust link 130 which is also recessed at its outer end to receive the pin 120; and the two thrust links are biased towards each other into contact with a guide roller 131 by a spring 132 connected to both of said links.

Figure 3:
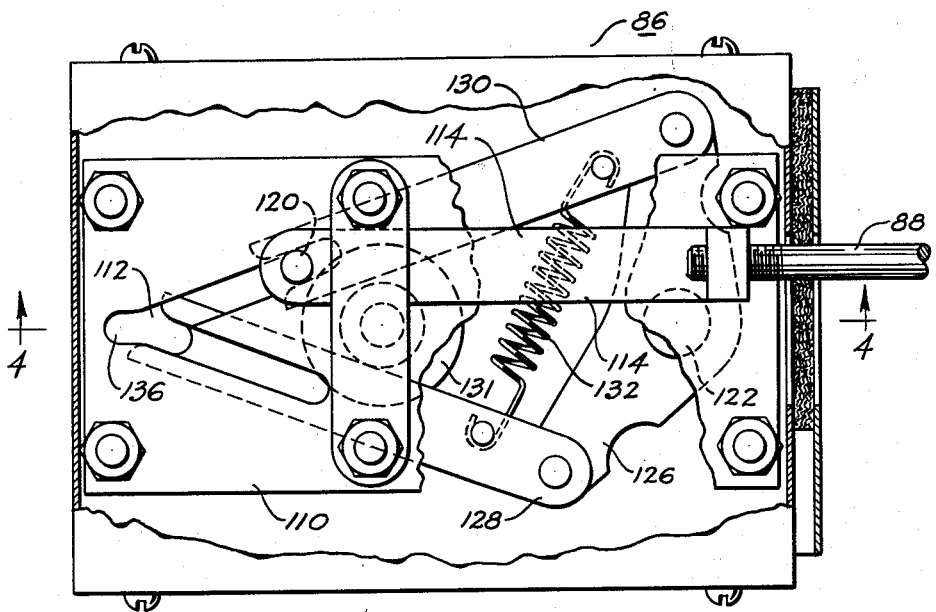
Figure 3 is a view disclosing details of the alternator unit of Figure 1.

Describing the operation of the above described alternator 86, when the fluid pressure motor 78 is deenergized a return spring 134 therein together with the clutch springs, serve to move the link 88 and thrust member 114 connected thereto to the left, Figure 3, to position the pin 120 within a recess 136 constituting the apex of the aforementioned V-shaped guide slot 112; then when the motor 78 is energized to effect an operation on the transmission and clutch the pin 120, after moving a relatively short distance, rests within the recessed end of one or the other of the thrust links 128 and 130, depending upon whether the transmission is at the time established in second gear or in high gear. Continued movement of the thrust member 114 then results in a rotation of the lever 126 to rotate the crank 98 to establish the transmission in its new setting; and as will be noted from an inspection of Figure 3 this operation of the lever 98 serves to move the then inoperative thrust link into position preparatory for its operation to rotate the lever 126.

There is thus provided an alternator or direction changing means whereby the transmission operating angular movement of the crank 14 is alternately reversed with each successive energization of the single-acting motor 78.

As to the means for controlling the operation of the motor 78, said means includes the electrical mechanism disclosed in Figures 1 and 2; and this mechanism comprises a grounded battery 138, the ignition switch 140 of the car, the aforementioned shift lever operated selector switch 47, an accelerator operated breaker switch 142 which is closed when the accelerator is released; a shift rail operated switch mechanism 144, a vehicle speed responsive governor operated switch mechanism 146 and a grounded solenoid 148 which operates the motor controlling three way valve 80. The aforementioned switch mechanisms are electrically interconnected as disclosed in Figure 2, and of said mechanisms the accelerator operated switch is of a conventional breaker switch construction; accordingly, the same is not disclosed in detail.

Figure 8:
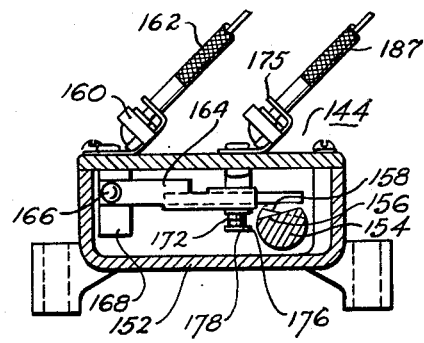
Figure 8 is a sectional view disclosing details of the transmission operating cut out switch of the invention, said view being taken on the line 8—8 of Figure 9.

As to the rail switch mechanism 144, which is disclosed in Figures 8 and 9 in its transmission neutral position, the same includes a two part casing 152 having journalled therein a switch operating cam shaft 154; and said shaft is provided with an inclined flat 153 and an oppositely inclined flat 158. A crank 155 is secured to the end of the shaft 154 and said crank is connected to the shift rail operating crank 14 by a link 157. A switch terminal 160 receives a hot wire 162, Figure 1, and to this terminal there is electrically connected a movable switch member 164 of electrical conductive material and which is pivotally connected at 166 to a post 168 secured to the inner face of the casing. Another movable switch member 170 electrically connected, by a conductor 167, Figure 12, to the terminal 160 and positioned alongside the switch member 164, is pivotally connected to a post 169 extending inwardly from the casing; and to said movable switch members 164 and 170 there are secured switch contacts 172 and 173 respectively. Torsion springs 174 and 174' serve to bias the switch members 164 and 170 downwardly to move the aforementioned switch contacts 172 and 173 into engagement with fixed switch contacts 176 and 181 which are mounted on supports secured to the switch casing, one of said supports being indicated by the reference numeral 178, Figure 8 and the other of said supports being indicated by the reference numeral 183, Figure 11. The contacts 176 and 181 are electrically connected, by the aforementioned support members, to terminals 175 and 177, Figure 9, which are wired, by wires 185 and 187 respectively, to the governor operated switch 146.

Describing the operation of the switch mechanism 144, when the transmission operating crank 14 is rotated clockwise by the power means to establish the transmission in its second gear setting the switch operating crank 155 is also moved in a clockwise direction; and this operation serves to rotate the cam shaft 154 clockwise, Figure 8, to open the switch 173, 181 mounted alongside the switch 172, 176 said operation of the switch 173, 181 being effected just as the second gear setting of the transmission is being completed. Now it is to be noted from an inspection of Figures 8 and 11 that when the switch mechanism 144 is in its transmission neutral position that both of the aforementioned switches of said mechanism are closed; and for that matter said switches 172, 176 and 173, 181 are both closed except when the transmission is established in either second gear or high gear; for an inspection of the electrical circuits of Figure 2 will reveal that to insure the heretofore described shuttling operation of the motor 78, particularly the vacuum energization of said motor to complete its operation of disengaging the clutch and resetting the transmission, it is necessary to maintain both switches 172, 176 and 173, 181 closed until either the high or second gear operation of the transmission is completed. When crank 14 is rotated counterclockwise to establish the transmission in its third gear setting the switch 172, 176 is opened the companion switch 173, 181 remaining closed; and as with the above described operation of the switch 173, 181 the opening of the switch 172, 176 is effected just as the high gear setting of the transmission is being completed.

Describing the governor operated switch mechanism 146, this mechanism includes a two part casing 180 housing a centrifugally operated governor mechanism 181 which is drivably connected to the propeller shaft of the vehicle or some other moving part of the power plant, the speed of which is directly proportional to the speed of the vehicle. A thrust member 182 of the centrifugal mechanism contacts the central portion of a movable switch contact member 184 which is biased into engagement with a fixed contact 186 by a spring 188. The parts of this switch mechanism are so constructed and arranged and so operative that when the vehicle is at a standstill or is travelling at or below a relatively low speed, for example 10 M. P. H., then the spring 188 serves to move the movable contact member 184 into engagement with the fixed contact 186; and when the vehicle is travelling above governor speed, that is the aforementioned 10 M. P. H., then the centrifugally operated mechanism 181 is operative to force the contact 184 into engagement with a fixed contact member 190. Completing the description of the switch mechanism 146 the other end of the movable contact member 184 is electrically connected to a wire 185 which is connected to the solenoid 148.

Now the parts of the shift rail operated switch 144 are so operative and so cooperate with the governor operated switch 146 that an electrical circuit from the accelerator operated switch 142 to the solenoid 148 is completed when the transmission is established in one or the other of its second or high gear settings and the governor is operated to close one of the two switches operated thereby; for it is to be remembered that the switches 172, 176 and 173, 181 are both closed except when the transmission is established in either second gear or high gear the switch 172, 176 being opened when the latter setting of the transmission is completed and the switch 173, 181 being opened when the second gear setting of the transmission is completed. In other words, just as the second gear setting of the transmission is being completed, one of the switches of the mechanism 144 is broken, the other switch being at the time made to thereby prepare for a high gear operation of the mechanism of my invention; then when the speed of the vehicle goes above governor speed, the motor 78 is again energized to effect the high gear setting of the transmission. It is to be remembered, however, that the above discussed electrical circuits are completed to effect an energization of the motor 78 only when the accelerator is released to close the switch 142.

As an additional feature of my invention there is provided mechanism for insuring a closure of the engine throttle 194 as the motor 78 is operating to actuate the transmission and clutch; for if such a mechanism were not provided, then a depression of the accelerator prior to a completion of the operation of the transmission and clutch would, by virtue of the opening of the switch 142, prevent the completion of these operations. Furthermore, such a depression of the accelerator would result in an undesirable racing of the engine while said operations were being effected. Accordingly, the power means of my invention preferably includes a single-acting fluid pressure motor 196 having its power element operably connected with a throttle operating crank 198 by means of a link 200, said link being provided with a slotted end portion through which extends a pin 202 secured to said crank. Through a boss 204 secured to the crank 198 there extends a rod 206 connected to the accelerator 208 of the vehicle, a compression spring 210 being interposed between said boss and a stop 212 secured to the end of said rod. The accelerator operated switch 142 is actuated by a crank 214 which is operably connected to the pin 202 by a link 216; and the throttle operating crank 198 is biased to its throttle closed position by a spring, not shown.

Describing the operation of the above described throttle operating mechanism, when the accelerator is released, the switch 142 is closed to make possible the above described power operation of the mechanism of my invention; and with this operation the motor 196 is energized to maintain the crank 198 in its throttle closed position despite a depression of the accelerator during said operation; for if said accelerator is so operated, then the spring 210 is further compressed.

At this juncture it is to be noted that the transmission and clutch operating fluid motor 78 and the throttle operating fluid motor 196 are both disclosed as being vacuum operated; however, said motors may, if desired, be energized by any other suitable power medium. The three way valve 80 of the motor 78 of Figure 1 is connected by a conduit 218 to the intake manifold of the internal combustion engine of the vehicle, said manifold providing a convenient source of vacuum when the engine is idling; and to a duct 220, interconnecting the valve 80 with the motor 78 there is connected a conduit 222 which is connected to the throttle operating motor 196. It is apparent, therefore, that the valve 80 serves to control both of the motors 78 and 196, said motors being operated at the same time.

Describing now the complete operation of the mechanism of my invention, and incidentally completing the description of the parts of said mechanisms not heretofore described, it will be assumed that the three-speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 26 to disengage the clutch and will then operate the shift lever 43 to manually effect said setting. The accelerator will then be depressed as the clutch is reengaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the seven selective positions of said lever. Describing the latter operation the shift lever 43, which at the time is in its second gear setting, is rotated downwardly that is angularly in a clockwise direction in a plane perpendicular to the plane of the steering wheel; and this operation serves to bodily move the shaft 32 downwardly until a movable contact member 224, Figure 5, of the selector switch 47 is in contact with a fixed contact 226 of said switch to close the same. This operation constitutes a declutching operation for the clutch mechanism 42, the clutch member 52 moving away from the clutch member 44 the movement of the latter being prevented by the stop 68.

Figure 5:
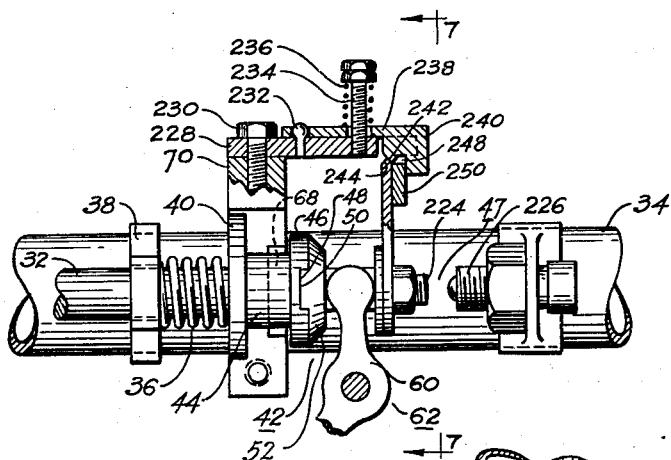
Figure 5 is an enlarged view of the mechanism at the base of the steering column said mechanism serving to disconnect the shift lever from the power operated transmission operating linkage.
Figure 6:
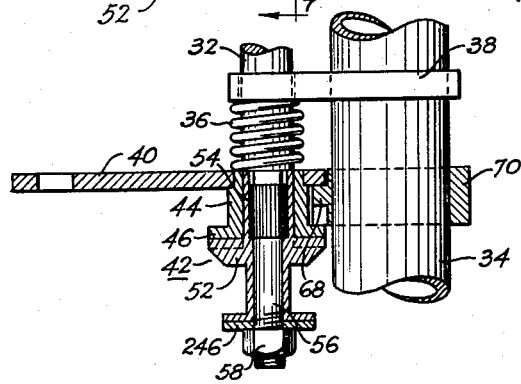
Figure 6 is a sectional view, taken on the line 6—6 of Figure 7, disclosing certain features of the mechanism disclosed in Figure 5.
Figure 7:
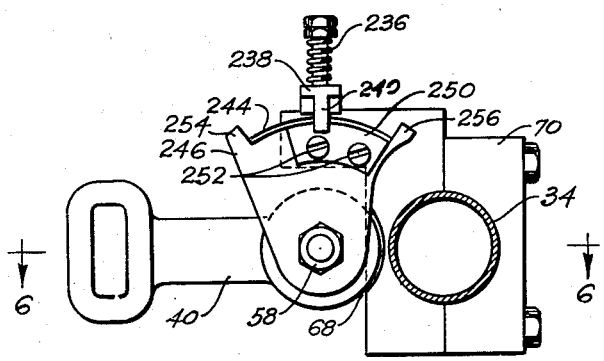
Figure 7 is a front view, taken on the line 7—7 of Figure 5, of the mechanism disclosed in Figure 5.

Referring to Figures 5 and 7 there is disclosed a latch mechanism for holding the shift lever in its automatic position, said mechanism including a relatively narrow rectangular shaped support member 228 preferably detachably secured to the bracket member 70 by a bolt 230; and there is mounted on said support member, by means of a guide pin 232, a bolt 234 and a spring 236, a movable latch member 238 shaped at its outer end to provide a relatively narrow stop member 240. Now when the shift lever 43 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56, Figure 6, between the lower flange portion of the clutch member 52 and the nut 58; and this operation serves to position said peripheral edge portion 244 in the space indicated by the reference numeral 248 Figure 5. Incidently the shift rail selecting mechanism of the transmission and the cooperating transmission parts are so constructed that the crank 62 may be moved beyond its second and high shift rail selective position in effecting the above described automatic setting of the shift lever.

Now at this juncture it is to be noted, from an inspection of Figure 7, that a rectangular shaped stop member 250, secured to the outer face of the stop member 246 by screws 252, is in contact with the member 240 when the parts are in their transmission neutral position and when the spring 36 has operated to move the crank 12 to its second and high shift rail position, that is the position preparing the transmission for either second or high gear operation. It follows therefore that the stop member 246 must be rotated clockwise in Figure 7 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 7 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Figure 10:
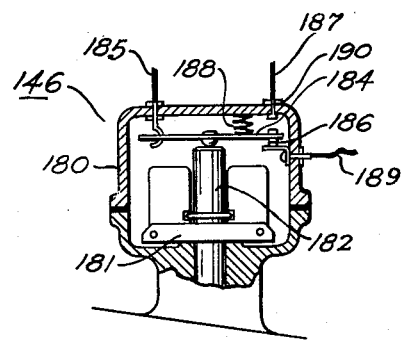
Figure 10 is a sectional view disclosing details of the governor operated switch of the invention.

Continuing the description of the operation of the mechanism the driver having moved the shift lever to its automatic position and assuming that the car is travelling above governor speed to close the switch 184, 190, Figure 10, the transmission will then be automatically established in its high gear setting after the driver releases the accelerator to close the switch 142; for with this operation an electrical circuit is completed via the grounded battery 138, the ignition switch 140, the then closed selector switch 47 the then closed accelerator operated switch 142, the switch 172, 176 of the rail switch 144, the switch 184, 190 of the governor operated switch 146 and the grounded solenoid 148. The resulting operation of the three way valve 150 effects an energization of the motors 196 and 78 the piston 82 of the latter being then subjected to a differential of pressures to move the same to the right, Figure 1. The left side of the piston 82 is at all times subjected to the pressure of the atmosphere via an opening 258 in one end of the motor and the right side of said piston, that is, the side constituting a wall of compartment 260, is subjected to a relatively low gaseous pressure when the three way valve 150 is opened to interconnect said compartment with the intake manifold or other source of vacuum. When the latter valve is closed, that is, when the solenoid 148 is deenergized, the compartment 260 is vented to the atmosphere through said valve and the spring 134 within said compartment is then operative to move the piston 82 to the left, Figure 1, to permit a reengagement of the friction clutch.

Describing the clutch disengaging and transmission operating operation of the motor 78 the above referred to rightward movement of the piston 82 serves to rotate the crank 24 to disengage the clutch; and as this operation is being effected the spring 94 is expanded inasmuch as the rod 88 cannot be moved to operate the transmission until after the driving torque is reversed, that is, until after the clutch is disengaged. Now immediately after the clutch plates are moved out of contact with each other to reverse the driving torque the above described force transmitting means interconnecting the rod 88 and crank 14 becomes operative to move said crank and establish the transmission in its high gear setting; and as this operation of the transmission is being completed the rail switch 144 becomes operative to break the switch 172, 176. Now the breaking of the switch 172, 176 results in a deenergization of the solenoid 148 and as described above this results in a deenergization of the motors 78 and 196 to permit a reengagement of the clutch and an opening of the throttle. At this juncture it is to be remembered that when the alternator 86 is operated in the operation of establishing the transmission in its high gear setting, said alternator is operated immediately thereafter to preselect a subsequent operation of the transmission to establish the same in its second gear setting; incidently Figure 3 discloses the parts of the alternator in their high gear setting.

Now as described above during this power operation of the mechanism in establishing the transmission in its high gear setting the throttle 16 is held closed by the then energized motor 196 thereby preventing a racing of the engine.

The transmission will now remain in its high gear setting until the car is slowed down below governor speed and the accelerator is released whereupon the motors 78 and 196 will again be energized to establish the transmission in its second gear setting and to operate the clutch and throttle to facilitate said operation. If the car is then brought to a stop without neutralizing the transmission, that is leaving the shift lever in its automatic setting, the operation of the fluid coupling of the power plant will obviate a stalling of the engine despite the relatively high gear ratio setting of the transmission and despite the fact that the idling engine is at the time directly connected to the then stationary propeller shaft of the vehicle.

There is thus provided a simple, effective and efficient manually and power operated mechanism for operating the transmission, clutch and throttle of an automotive vehicle; and the clutch pedal, the shift lever and the accelerator constitue the only manually operated controls of said mechanism. With the mechanism of my invention the driver may manually operate the clutch and the three speeds forward and reverse transmission in a conventional manner, that is, by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator. However, if the car becomes mired he probably will, after a manual disengagement of the clutch, operate the shift lever to establish the transmission in its low gear setting; and to reverse the direction of movement of the car the driver must, of course, first manually disengage the clutch and then operate the shift lever to establish the transmission in its reverse gear setting.

If a second gear setting of the transmission is desired when the transmission is established in its high gear setting and the shift lever is positioned in its automatic setting, then the driver will, after manually disengaging the clutch, first move the shift lever out of its automatic setting whereupon he will successively rotate the shift lever to its high gear position to mesh the clutch members 44 and 52 and then rotate said lever to its second gear position.

I claim:

1. In an automotive vehicle provided with a three speeds forward and reverse transmission, a friction clutch, an accelerator, a clutch pedal, a steering column, a gear shift lever and a vehicle speed responsive governor; manually and power operated means for operating the clutch and transmission comprising two cranks extending from the casing of the transmission, one of said cranks serving to operate mechanism within the transmission which selects one or the other of two shift rails of the transmission and the other of said cranks serving to operate mechanism within the transmission which moves the selected rail to either neutralize the transmission or establish the same in any one of its four settings; force transmitting means, including a shift lever controlled clutch mechanism mounted at the base of the steering column, interconnecting the gear shift lever with the two cranks, and power means, supplementing the operation of the aforementioned force transmitting means, and operative to effect a power operation of the clutch and an operation of the last mentioned crank to alternately establish the transmission in either its second gear setting or its high gear setting, said power means including an accelerator operated switch mechanism and a governor operated switch mechanism.

2. In an automotive vehicle provided with a three speeds forward and reverse transmission, a friction clutch, an accelerator, a gear shift lever and a vehicle speed responsive governor; power and manually operated mechanism for operating the transmission and also operating the clutch to facilitate an operation of the transmission, said mechanism including two cranks extending from the casing of the transmission, one of said cranks serving to operate mechanism within the transmission casing which selects one or the other of the two shift rails of the transmission and the other of said cranks serving to operate mechanism within the transmission which moves the selected rail to either neutralize the transmission or establish the same in any one of its settings, force transmitting means interconnecting the shift lever and cranks and serving to actuate said cranks to effect a manual operation of the transmission, together with transmission and clutch operating power means including a single acting pressure differential operated motor, means for controlling the operation of said motor including valve means, and electrical means for controlling the operation of said valve means including an accelerator operated switch and a governor operated switch, said motor being operatively connected with a part of the force transmitting means and with the clutch and serving to alternately effect the second and high gear operations of the transmission and to effect the aforementioned operation of the clutch.

3. In an automotive vehicle provided with a three speeds forward and reverse transmission, a throttle, a shift lever, a vehicle speed responsive governor and a friction clutch; manually and power operated mechanism for operating the transmission and for operating the clutch and throttle to facilitate the operation of the transmission, said mechanism including force transmitting means interconnecting the shift lever and transmission and serving to effect a manual operation of the transmission by the operation of moving the shift lever to six of its selective positions, said mechanism further including a presure differential operated motor and means for controlling the operation of said motor comprising power means, including an accelerator operated switch mechanism, a governor operated switch mechanism and a shift lever operated switch mechanism, for alternately effecting the second and high gear operations of the transmission, for disengaging the clutch prior to each of the latter operations of the transmission and then effecting a reengagement of the clutch after the operation of the transmission is completed and for maintaining the throttle closed as the transmission is being operated.

4. Transmission and clutch operating mechanism for an automotive vehicle comprising a three speeds forward and reverse transmission and a clutch operating shaft, a crank extending from the casing of the transmission and operable to select one or the other of two shift rails of the transmission, another crank also extending from the casing of the transmission and operable to neutralize the transmission and to establish the same in any one of its four settings, a shift lever mounted beneath the steering wheel of the vehicle and selectively movable to any one of seven positions in the operation of the mechanism six of said operations being effected by the physical effort of the driver and the remaining, that is seventh, operation serving to prepare the mechanism for a power operation of the clutch and transmission, force transmitting means interconnecting the aforementioned cranks and the shift lever said means including clutch means operable, when the shift lever is moved to the aforementioned seventh position, to disconnect the shift lever from that part of the force transmitting means which is power operated, and power means automatically operative, after the shift lever is moved to the latter position, to alternately establish the transmission in two of the aforementioned gear settings and to operate the clutch to facilitate said operation of the transmission.

5. Transmission and clutch operating mechanism for an automotive vehicle comprising a three speeds forward and reverse transmission and a friction clutch, a crank extending from the casing of the transmission and operable to select one or the other of two shift rails of the transmission, another crank also extending from the casing of the transmission and operable to neutralize the transmission and to establish the same in any one of its four settings, a shift lever mounted beneath the steering wheel of the vehicle and selectively movable to any one of seven positions in the operation of the mechanism, six of said operations being effected by the physical effort of the driver and the remaining, that is seventh, operation serving to prepare the mechanism for a power operation of the clutch and transmission, force transmitting means interconnecting the aforementioned cranks and the shift lever said means including clutch means operable, when the shift lever is moved to the aforementioned seventh position, to disconnect the shift lever from that part of the force transmitting means which is power operated, and power means including an electrical switch which is closed when the shift lever is moved to the latter position, said power means being operative to alternately establish the transmission in two of the aforementioned forward gear settings and to operate the friction clutch to facilitate said operation of the transmission.

6. Force transmitting means for interconnecting the shift lever of an automotive vehicle with a shift rail selecting crank and a shift railing operating crank extending from the casing of a three speeds forward and reverse transmission of said vehicle; said force transmitting means including a rotatable and axially movable shaft operably connected to the shift lever, a clutch member drivably connected to the lower end of said shaft, force transmitting means interconnecting said clutch member with the shift rail selecting crank, another clutch member adapted to be detachably connected to the first-mentioned clutch member and rotatably mounted on said rotatable and axially movable shaft, a crank connected to the latter clutch member, force transmitting means interconnecting the latter crank with the shift rail operating crank, a stop member, means for biasing the first-mentioned shaft and clutch members downwardly, the movement of one of said clutch members being limited by said stop member, latch means for limiting the downward movement of the other of said clutch members when the shift lever is moved to one of its selective positions and means for making the latter downward movement possible when and only when said clutch members are rotated to a certain angular position whereby there is provided a mechanism making possible three selective positions of the shift lever as the same is moved in two planes perpendicular to the steering wheel and a mechanism for effecting a shift rail operating angular movement of the aforementioned shift rail operating crank.

7. In an automotive vehicle having a power plant comprising a friction clutch, a three speeds forward and reverse change-speed transmission and an internal combustion engine having a throttle valve; manually and power operated mechanism for operating the throttle valve, the clutch and the transmission including a single-acting pressure differential operated motor for operating both the clutch and the transmission, the latter being power operated to establish the same in its second and third gear ratio settings and the clutch being operated to facilitate the operation of the transmission, a pressure differential operated motor for operating the throttle to maintain the same closed as the transmission is being operated by the aforementioned motor, manually operated force transmitting means for establishing the transmission in any one of its settings, power operated force transmitting means interconnecting the manually operated force transmitting means with the first mentioned motor and means for controlling the operation of the aforementioned mechanism including the accelerator of the vehicle, a manually operated clutch pedal and a manually operated gear shift lever.

8. In an automotive vehicle having a power plant comprising a fluid coupling, a friction clutch, a change-speed transmission and an internal combustion engine having a throttle valve; manually and power operated mechanism for operating the throttle valve, the clutch and the transmission including a motor for operating the throttle valve to maintain the same closed as the transmission is being operated, a single-acting pressure differential operated motor for operating both the clutch and the transmission, the latter being power operated to establish the same in two of its relatively high gear ratio settings, said operation being facilitated by the operation of the fluid coupling, force transmitting manually operated means for establishing the transmission in any one of its settings, power operated force transmitting means interconnecting the manually operated force transmitting means with the second mentioned motor and means for controlling the operation of the aforementioned mechanism including the accelerator of the vehicle, a manually operated clutch pedal and a manually operated gear shift lever.

9. In an automotive vehicle provided with a power plant including a friction clutch, a change-speed transmission and an internal combustion engine having a throttle valve; maually and power operated mechanism for operating the clutch, the transmission and the throttle valve, said means including manually operable means for establishing the transmission in any one of its settings, a motor for operating the throttle valve to maintain the same closed as the transmission is being operated, a single-acting motor and means interconnecting said motor with the manually operable means and the clutch for effecting a sequential operation of the clutch and transmission, the operation of the latter serving to establish the same in one or the other of two relatively high gear ratio settings, and means for controlling the operation of the mechanism set forth above, said control means including the accelerator of the vehicle, a manually operated clutch pedal, a vehicle speed responsive governor and a gear shift lever the clutch pedal and gear shift lever serving as part of the means for effecting a manual operation of the mechanism.

10. In an automotive vehicle provided with a power plant including a friction clutch, a change-speed transmission and an internal combustion engine having a throttle valve; manually and power operated mechanism for operating the clutch, the transmission and the throttle valve the latter being closed when the transmission is being power operated, said means including force transmitting means which may be manually operated to establish the transmission in any one of its settings, a single-acting motor for operating the throttle valve, a transmission and clutch operating single-acting motor, force transmitting means interconnecting said latter motor with the aforementioned force transmitting means and the clutch said force transmitting means being operable to effect a sequential operation of the clutch and transmission the operation of the latter serving to establish the same in one or the other of two relatively high gear ratio settings, and means for controlling the operation of the mechanism set forth above said control means including the accelerator of the vehicle, a manually operated clutch pedal, a vehicle speed responsive governor and a gear shift lever selectively movable to any one of seven control positions the clutch pedal and gear shift lever serving as part of the means for effecting a manual operation of the mechanism and the accelerator and governor serving as part of the means for effecting a power operation of the mechanism.

11. In an automotive vehicle provided with a power plant comprising a friction clutch, a change speed transmission and an internal combustion engine having a throttle valve; manually and power operated mechanism for operating the clutch, the transmission and the throttle valve the latter being closed when the transmission is being power operated, said means including a single-acting pressure differential operated motor operably connected to the transmission and clutch by means which serves to operate the clutch in timed relation to a certain operation of the transmission, a motor for operating the throttle valve to facilitate the aforementioned power operation of the transmission and clutch, manually operated force transmitting means for effecting the operation of the transmission and means for controlling the operation of the mechanism set forth above, said control means including the accelerator of the vehicle, a vehicle speed responsive governor, a manually operated clutch pedal and a gear shift lever the clutch pedal and gear shift lever serving as part of the means for effecting a manual operation of the mechanism and the accelerator and governor serving as part of the means for effecting a power operation of the mechanism.

12. In an automotive vehicle provided with a power plant comprising a friction clutch, a change speed transmission and an internal combustion engine having a throttle valve; manually and power operated means for operating the clutch, the transmission and the throttle valve the latter being closed when the transmission is being power operated, said means including a single-acting pressure differential operated motor operably connected to the transmission and clutch by means including a spring said latter means serving to operate the clutch in timed relation to certain power operations of the transmission, a motor for operating the throttle valve in a certain timed relation to the aforementioned power operation of the transmission and clutch, manually operated means, including force transmitting means mounted on the steering post of the vehicle, for effecting an operation of the transmission and means, including electrical means, for controlling the operation of the mechanism set forth above, said control means including the accelerator of the vehicle, a vehicle speed responsive governor, a manually operated clutch pedal and a gear shift lever the clutch pedal and gear shift lever serving as part of the means for effecting a manual operation of the mechanism and the accelerator and governor serving as part of the means for effecting a power operation of the mechanism.

13. The combination with a friction clutch and a change speed transmission capable of being established in any one of three forward gear settings, a reverse gear setting or a neutral setting; of transmission and clutch operating mechanism including two cranks extending from the casing of the transmission one of said cranks when operated serving to effect a shift rail selecting operation of the transmission, the other of said cranks serving when actuated to effect any one of the settings of the transmission, a pressure differential operated motor operably connected to the friction clutch and to the last mentioned crank and serving to effect a power operation of said crank to effect either a high gear operation or a second gear operation of the transmission, the clutch being operated incidental to the latter operation of the transmission to facilitae said operaions, valve means for controlling the operation of said motor, electrical means, including an accelerator operated switch, a shift lever operated switch and a governor operated switch, for controlling the operation of said valve means, and manually operated means, including a selector lever movable to seven different control positions, for in part controlling the operation of the mechanism.

14. In an automotive vehicle provided with a change speed transmission, a friction clutch, an accelerator, and a vehicle speed responsive governor; manually and power operated means for operating the clutch and transmission comprising force transmitting means interconnecting the gear shift lever with the transmission, and power means, supplementing the operation of the force transmitting means, and operative to effect a power operation of the clutch and an operation of the transmission to alternately establish the same in one or the other of two settings, said power means including a pressure differential operated motor having its power element connected to the clutch and to the transmission operating force transmitting means, means for controlling the operation of the motor including valve means, and means for controlling the operation of said valve means including an accelerator operated switch, a governor operated switch mechanism, and a switch mechanism actuated by the motor, the latter switch mechanism being operative, just as the operation of the transmission is being completed, to make possible a de-energization of the motor.

15. In an automotive vehicle provided with a change speed transmission and a gear shift lever; manually and power operated means for operating the transmission comprising force transmitting means, including a clutch mechanism, interconnecting the gear shift lever with the transmission, and power means, supplementing the operation of the force transmitting means, and operative to effect a power operation of the transmission to alternately establish the same in one or the other of two settings, said power means including a pressure differential operated motor having its power element connected to the force transmitting means, and means for controlling the operation of the motor including a gear shift lever operated switch operable, when the shift lever is placed in a certain position, to render the power means operative, the aforementioned clutch mechanism then serving to disconnect the shift lever from a part of the force transmitting means whereby the gear shift lever is immobile when the power means is operative to oprate the clutch and transmission.

EARL R. PRICE.

REFERENCES CITED

The following references are of record in the file of this patent:

UNITED STATES PATENTS

| Number | Name | Date |
| --- | --- | --- |
| 922,316 | McNally | May 18, 1909 |
| 2,109,443 | Hill et al. | Feb. 22, 1938 |
| 2,169,216 | Bloxsom | Aug. 15, 1939 |
| 2,187,824 | Britton | Jan. 23, 1940 |
| 2,212,282 | Van Buskirk | Aug. 20, 1940 |
| 2,280,002 | Neracher | Apr. 14, 1942 |
| 2,287,272 | Price et al. | June 23, 1942 |
| 2,296,290 | Mayrath | Sept. 22, 1942 |
| 2,348,435 | Hey et al. | May 9, 1944 |
| 2,380,677 | Schjolin | July 31, 1945 |
| 2,434,717 | Randol | Jan. 20, 1148 |